United States Patent
Funamoto

(10) Patent No.: US 12,387,342 B2
(45) Date of Patent: Aug. 12, 2025

(54) IMAGE PROCESSING METHOD, IMAGE PROCESSING DEVICE, AND RECORDING MEDIUM FOR OBTAINING A COMPOSITE IMAGE BY SYNTHESIZING A HIGH-FREQUENCY IMAGE AND ONE OR MORE COLOR IMAGES

(71) Applicant: PANASONIC INTELLECTUAL PROPERTY MANAGEMENT CO., LTD., Osaka (JP)

(72) Inventor: Kazuhiro Funamoto, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 583 days.

(21) Appl. No.: 17/423,376

(22) PCT Filed: Jan. 16, 2020

(86) PCT No.: PCT/JP2020/001359
§ 371 (c)(1),
(2) Date: Jul. 15, 2021

(87) PCT Pub. No.: WO2020/240913
PCT Pub. Date: Dec. 3, 2020

(65) Prior Publication Data
US 2022/0130053 A1    Apr. 28, 2022

(30) Foreign Application Priority Data

May 30, 2019   (JP) ................................ 2019-101648

(51) Int. Cl.
*G06T 7/90*   (2017.01)
*G06T 5/40*   (2006.01)
(Continued)

(52) U.S. Cl.
CPC ............... *G06T 7/194* (2017.01); *G06T 5/40* (2013.01); *G06T 5/90* (2024.01); *G06T 7/90* (2017.01); *G06T 2207/20216* (2013.01)

(58) Field of Classification Search
CPC .......... G06T 7/194; G06T 5/007; G06T 5/40; G06T 7/90; G06T 2207/20216;
(Continued)

(56) References Cited

U.S. PATENT DOCUMENTS 5,539,523 A * 7/1996 Nakai ................... H04N 1/622
                                                    358/518
5,799,111 A * 8/1998 Guissin ................. H04N 19/86
                                                    358/463

(Continued)

FOREIGN PATENT DOCUMENTS

CN       109583364 A      4/2019
JP       H09-331543 A    12/1997
(Continued)

OTHER PUBLICATIONS

Eduardo S. L. Gastal and Manuel M. Oliveira. 2011. Domain transform for edge-aware image and video processing. ACM Trans. Graph. 30, 4, Article 69 (Jul. 2011), 12 pages. https://doi.org/10.1145/2010324.1964964 (Year: 2011).*
(Continued)

*Primary Examiner* — Sumati Lefkowitz
*Assistant Examiner* — Aaron Joseph Sorrin
(74) *Attorney, Agent, or Firm* — Rimon P.C.

(57) ABSTRACT

An image processing method includes: obtaining an image; generating a high frequency image according to a high frequency component based on a plurality of first pixel values of a plurality of first pixels of the image obtained; generating, according to color information based on the plurality of first pixel values of the image obtained, one or
(Continued)

more color images corresponding to one or more different colors; generating a composite image by weighted addition of the high frequency image and the one or more color images; and outputting the composite image generated.

16 Claims, 10 Drawing Sheets

(51) Int. Cl.
*G06T 5/90* (2024.01)
*G06T 7/194* (2017.01)

(58) Field of Classification Search
CPC ... G06T 2207/10024; G06T 2207/3019; G06T 2207/20182; G06V 40/10; G06V 10/50; G06V 10/56; H04N 5/142; H04N 23/84; H04N 23/951; H04N 9/646; H04N 1/60
See application file for complete search history.

(56) References Cited

U.S. PATENT DOCUMENTS

| | | | |
|---|---|---|---|
| 6,115,063 A | 9/2000 | Kameyama | |
| 6,282,317 B1* | 8/2001 | Luo | G06T 11/60 382/203 |
| 8,390,884 B2* | 3/2013 | Suzuki | G06V 10/50 358/1.9 |
| 9,336,575 B2 | 5/2016 | Asano | |
| 9,898,812 B1* | 2/2018 | Padfield | G06T 5/50 |
| 2004/0071352 A1 | 4/2004 | Mizoguchi et al. | |
| 2008/0055435 A1* | 3/2008 | Kawamura | H04N 23/673 348/E9.037 |
| 2014/0307978 A1* | 10/2014 | Balestrieri | H04N 23/80 382/263 |
| 2017/0034495 A1 | 2/2017 | Miura | |
| 2019/0108629 A1* | 4/2019 | Horiuchi | G06T 5/00 |
| 2020/0177807 A1* | 6/2020 | Kurihara | H04N 23/951 |

FOREIGN PATENT DOCUMENTS

| | | | | |
|---|---|---|---|---|
| JP | 2002314816 A | * | 10/2002 | |
| JP | 2004-038480 A | | 2/2004 | |
| JP | 2017-034481 A | | 2/2017 | |
| WO | 00/18128 A1 | | 3/2000 | |
| WO | WO-2011099648 A1 | * | 8/2011 | G06T 3/4007 |
| WO | WO-2013168397 A1 | * | 11/2013 | A61B 5/0095 |
| WO | 2014/002811 A1 | | 1/2014 | |

OTHER PUBLICATIONS

JP-2002314816-A—Original and English Translation (Year: 2002).*
WO-2013168397-A1—Original and English Translation (Year: 2013).*
WO-2011099648-A1—Original and English Translation (Year: 2011).*
G. Shen, L. Jiang and G. Zhang, "An Image Retrieval Algorithm Based on Color Segment and Shape Moment Invariants," 2009 Second International Symposium on Computational Intelligence and Design, Changsha, China, 2009, pp. 517-521 (Year: 2009).*
International Search Report and Written Opinion, issued on Mar. 17, 2020 in International Patent Application No. PCT/JP2020/001359; with partial English translation.
Extended European Search Report dated Jun. 30, 2022 issued in the corresponding European Patent Application No. 20813104.5.
Eduardo S. L. Gastal, et al., "Domain transform for edge-aware image and video processing", ACM Transactions on Graphics, vol. 30, No. 4, Jul. 1, 2011 (Jul. 1, 2011), p. 1, XP055176069.
Richard Y. D. Xu et al., "Robust real-time tracking of non-rigid objects", Advances in Ontologies, Australian Computer Society, Inc, P.O. Box 319 Darlinghurst, NSW 2010 AUSTRALIA, Jun. 1, 2004 (Jun. 1, 2004), pp. 95-98, XP058108698.

* cited by examiner

IMAGE PROCESSING METHOD, IMAGE PROCESSING DEVICE, AND RECORDING MEDIUM FOR OBTAINING A COMPOSITE IMAGE BY SYNTHESIZING A HIGH-FREQUENCY IMAGE AND ONE OR MORE COLOR IMAGES

CROSS-REFERENCE OF RELATED APPLICATIONS

This application is the U.S. National Phase under 35 U.S.C. § 371 of International Patent Application No. PCT/JP2020/001359, filed on Jan. 16, 2020, which in turn claims the benefit of Japanese Application No. 2019-101648, filed on May 30, 2019, the entire disclosures of which Applications are incorporated by reference herein.

TECHNICAL FIELD

The present disclosure relates to image processing methods, image processing devices, and recording media.

BACKGROUND ART

Patent Literature (PTL) 1 discloses an image recognition method in which spatial frequency information and chromaticity information are obtained from compressed and recorded image data for each predetermined block and a pixel of interest in the image data is identified.

CITATION LIST

Patent Literature

PTL 1: Unexamined Patent Application Publication No. 2004-038480

SUMMARY OF THE INVENTION

Technical Problem

However, in the image recognition method disclosed in PTL 1, although the pixel of interest can be identified in a specific video scene, there is a risk that a region other than the pixel of interest may be falsely detected in a different video scene. In other words, it is problematic that with the conventional technique, it is difficult to effectively identify the region of a subject that is used in a predetermined process such as a human figure in every video scene.

The present disclosure provides an image processing method, etc., in which a target region that is the region of a subject in an image can be effectively identified.

Solution to Problem

An image processing method according to the present disclosure includes: obtaining an image; generating a high frequency image according to a high frequency component based on a plurality of first pixel values of a plurality of first pixels of the image obtained; generating, according to color information based on the plurality of first pixel values of the image obtained, one or more color images corresponding to one or more different colors; generating a composite image by weighted addition of the high frequency image and the one or more color images; and outputting the composite image generated.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Advantageous Effect of Invention

With an image processing method according to the present disclosure, a target region that is the region of a subject in an image can be effectively identified.

DESCRIPTION OF EXEMPLARY EMBODIMENT

Figure 1:
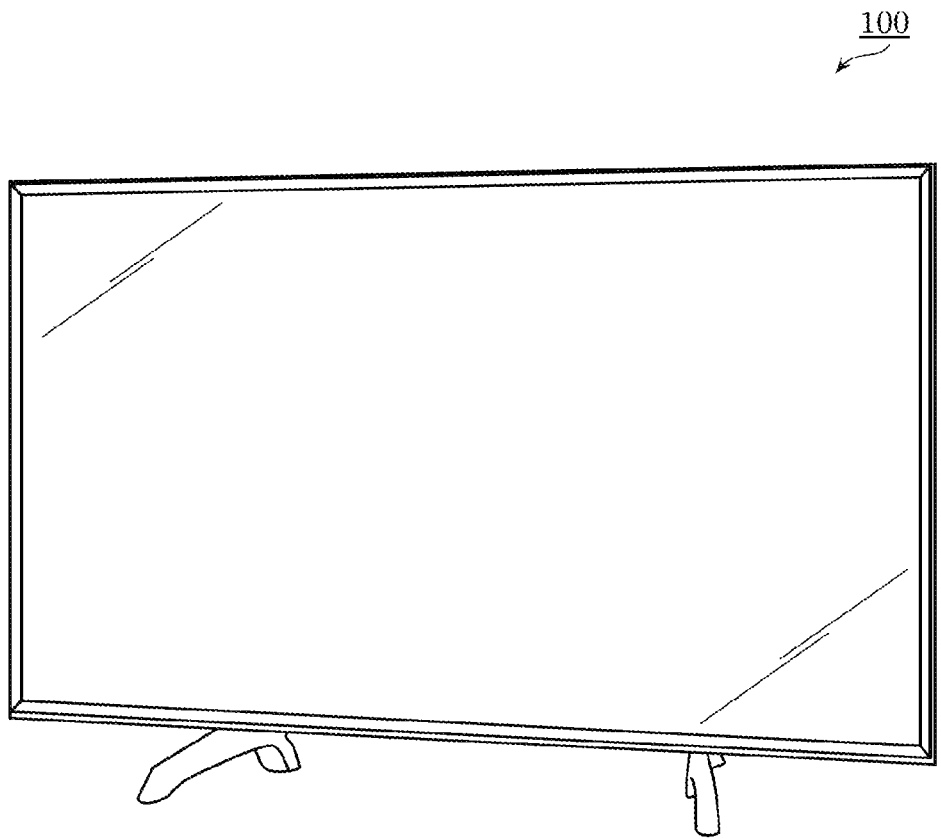
FIG. 1 is a perspective view illustrating one example of the external appearance of a display apparatus according to the present embodiment.

Hereinafter, an embodiment will be described in detail with reference to the drawings where appropriate. However, there are instances where overly detailed description will be omitted. For example, there are cases where detailed description of well-known matter or overlapping description of substantially identical elements will be omitted. This is in order to prevent the subsequent description from becoming overly verbose and to facilitate the understanding of a person having ordinary skill in the art.

Note that the accompanying drawings and the subsequent description have been provided by the inventor in order for a person having ordinary skill in the art to sufficiently understand the present disclosure, and thus they are not intended to limit the scope of the subject matter of the appended Claims.

In order to solve the aforementioned problem, an image processing method according to one aspect of the present disclosure includes: obtaining an image; generating a high frequency image according to a high frequency component based on a plurality of first pixel values of a plurality of first pixels of the image obtained; generating, according to color information based on the plurality of first pixel values of the image obtained, one or more color images corresponding to one or more different colors; generating a composite image by weighted addition of the high frequency image and the one or more color images; and outputting the composite image generated.

With this, the composite image obtained by combining a high frequency image and one or more color images can be output as an image indicating a target region. Therefore, by using the composite image, it is possible to effectively identify the target region that is the region of a subject in the foreground, and it is possible to exclude, from the target region, the background region and the region of a subject in the background. Accordingly, the target region in the image can be effectively identified.

Furthermore, the generating of the composite image may include assigning less weight to the high frequency image than to each of the one or more color images, when the high frequency component included in the image is greater than a first threshold value.

For example, when the high frequency component included in the image is greater than the first threshold value, the scene of the obtained image can be estimated as a scene in which the subject is present in the foreground and the background includes many high frequency components. Therefore, in this case, by assigning less weight to the high frequency image than to the one or more color images to generate the composite image, it is possible to reduce the occurrence of the subject in the foreground being excluded while reducing the occurrence of the background being identified as the target region.

Furthermore, the generating of the composite image may include assigning more weight to the high frequency image than to each of the one or more color images, when the high frequency component included in the image is less than a second threshold value.

For example, when the high frequency component included in the image is less than the second threshold value, the scene of the obtained image can be estimated as a scene in which the subject is present in the foreground and the background includes many low frequency components. Therefore, in this case, by assigning more weight to the high frequency image than to the one or more color images to generate the composite image, it is possible to reduce the occurrence of the subject in the foreground being excluded while reducing the occurrence of the background being identified as the target region.

Furthermore, the generating of the composite image may include assigning less weight than a predetermined reference value to the high frequency image and each of the one or more color images, when a size of a first region in which the high frequency image and the one or more color images overlap each other is larger than a third threshold value.

For example, when the size of the first overlap region in which the high frequency image and the one or more color images overlap each other is larger than the third threshold value, the scene of the obtained image can be estimated as a scene in which the target region appears small. Therefore, in this case, by assigning less weight than a predetermined reference value to the high frequency image and the one or more color images to generate the composite image, it is possible to reduce the occurrence of the background being identified as the target region while leaving the region of the subject in the foreground as the target region.

Furthermore, the generating of the composite image may include assigning zero weight to the high frequency image and each of the one or more color images, when a size of a second region made up of pixels determined as having a specific color in the image obtained is smaller than a fourth threshold value.

For example, when the size of the second region made up of the pixels determined as having the specific color in the image is smaller than the fourth threshold value, the scene of the obtained image can be estimated as a scene in which the subject is not present in the foreground. Therefore, in this case, by assigning zero weight to the high frequency image and the one or more color images to generate the composite image, it is possible to output a composite image indicating that no target region is included in the image.

Furthermore, the image processing method may further include performing a predetermined image process on the image, based on a plurality of second pixel values of a plurality of second pixels of the composite image that has been output.

Since the predetermined image process can be performed on the target region effectively identified in the image, it is possible to perform the predetermined image process with accuracy.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

EMBODIMENT

Hereinafter, an embodiment will be described with reference to FIG. 1 to FIG. 10.

Configuration and Operation

FIG. 1 is a perspective view illustrating one example of the external appearance of a display apparatus according to the present embodiment.

As illustrated in FIG. 1, the external appearance of display apparatus 100 is that of a general flat-panel display in which a display device including a display panel is housed in a casing. Display apparatus 100 is, for example, a liquid-crystal display or an organic electroluminescent display.

Figure 2:
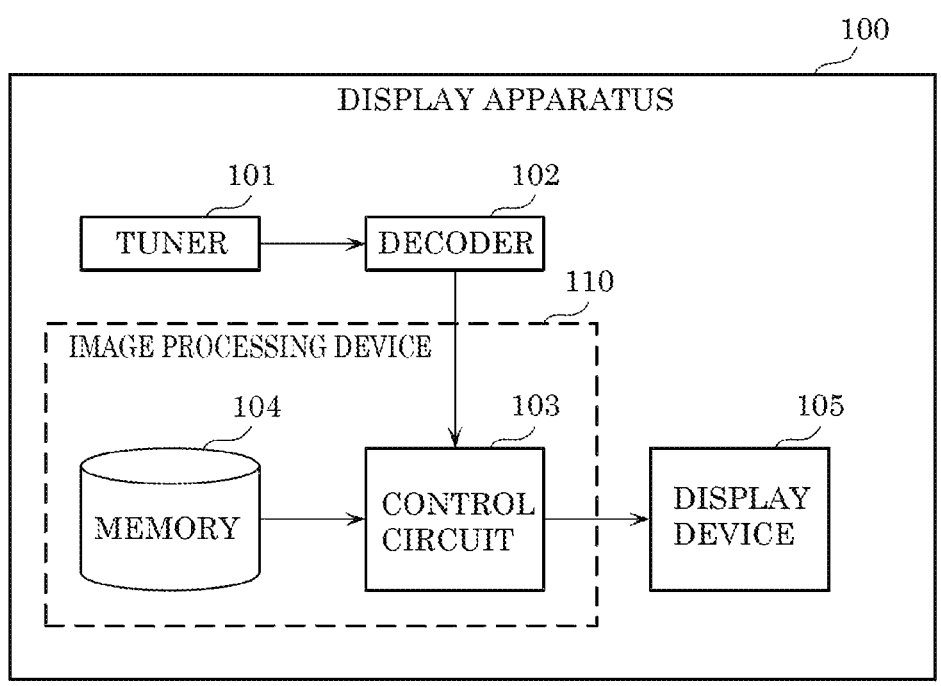
FIG. 2 is a block diagram illustrating one example of the hardware configuration of a display apparatus according to the present embodiment.

FIG. 2 is a block diagram illustrating one example of the hardware configuration of a display apparatus according to the present embodiment.

As illustrated in FIG. 2, display apparatus 100 includes tuner 101, decoder 102, control circuit 103, memory 104, and display device 105. Control circuit 103 and memory 104 constitute image processing device 110. Thus, display apparatus 100 is an apparatus into which image processing device 110 is built-in.

Tuner 101 converts an analog signal that is included in airwaves received from an antenna not illustrated in the drawings, into encoded data that is a digital signal, and outputs, to decoder 102, the encoded data obtained by conversion. Decoder 102 decodes the encoded data obtained from tuner 101, and outputs, to control circuit 103, image data obtained by decoding. The image data represents an image including a moving image or a still image.

Control circuit 103 performs a predetermined image process on the image represented by the image data output by decoder 102. When the image is a moving image, control circuit 103 performs the predetermined image process on each of a plurality of pictures included in the moving image. When the image is a still image, control circuit 103 performs the predetermined image process on the still image. Control circuit 103 outputs, to display device 105, image data (hereinafter referred to as "image-processed image data") representing an image (hereinafter referred to as an "image-processed image") obtained by performing the image process. Thus, display device 105 can display the image-processed image.

Note that decoder 102 and control circuit 103 may be provided as the same circuit. Furthermore, control circuit 103 may be provided as a general-purpose processor such as a central processing unit (CPU) that performs a predetermined control program or may be provided as a dedicated circuit. In other words, the functions of display apparatus 100 may be implemented using software or may be implemented using hardware.

Memory 104 may store a control program and various data to be used to perform the control program. Memory 104 is, for example, a non-volatile memory.

Display device 105 displays the image-processed image represented by the image-processed image data output by control circuit 103. Display device 105 is a display panel and includes, for example, a liquid-crystal panel or an organic electroluminescent panel.

Next, the functional configuration of the image processing device will be described.

Figure 3:
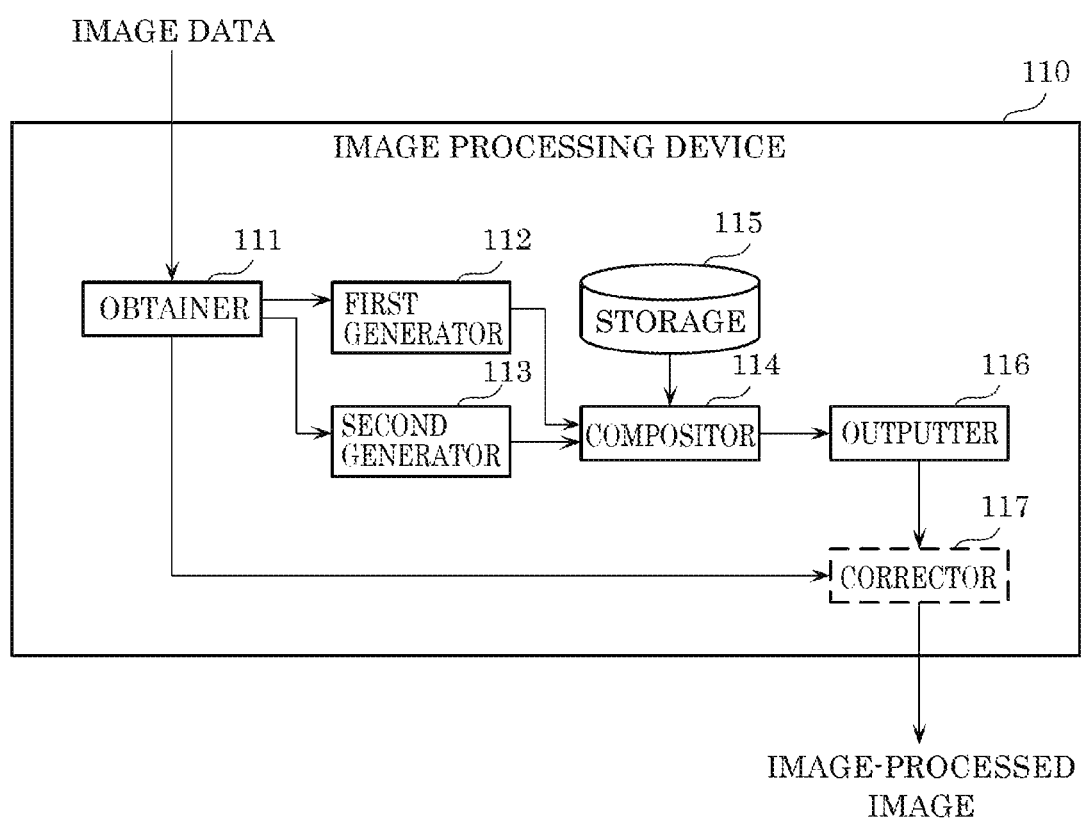
FIG. 3 is a block diagram illustrating one example of the functional configuration of an image processing device according to the present embodiment.
Figure 4:
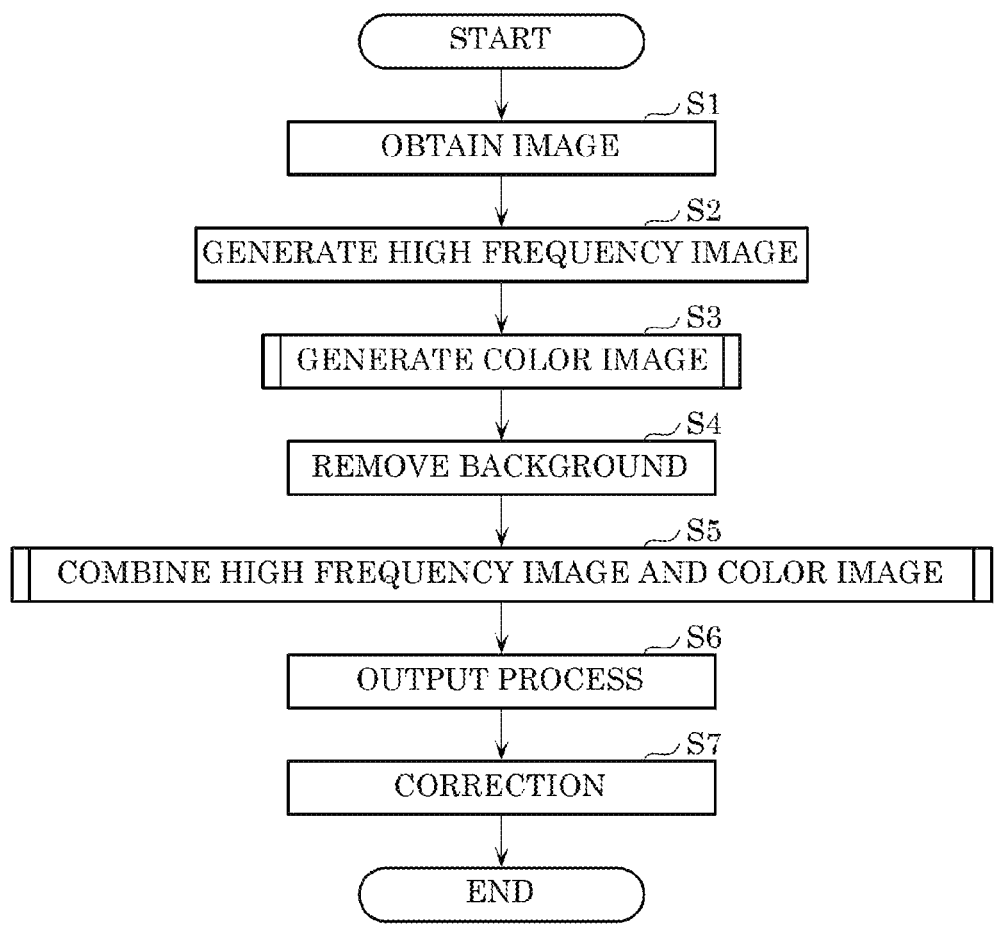
FIG. 4 is a flowchart illustrating one example of an image processing method performed by an image processing device according to the present embodiment.

FIG. 3 is a block diagram illustrating one example of the functional configuration of an image processing device according to the present embodiment. FIG. 4 is a flowchart illustrating one example of an image processing method performed by an image processing device according to the present embodiment.

Here, the function blocks of image processing device 110 will be described with reference to FIG. 3, and the flow of processes performed in the function blocks will be described with reference to FIG. 4.

Image processing device 110 includes obtainer 111, first generator 112, second generator 113, compositor 114, storage 115, and outputter 116. Image processing device 110 may further include corrector 117.

Obtainer 111 obtains the image data (S1). Obtainer 111 obtains the image by obtaining the image data from decoder 102 of display apparatus 100, for example. Step S1 is one example of the step of obtaining.

First generator 112 generates a high frequency image according to a high frequency component based on a plurality of first pixel values of a plurality of first pixels of the obtained image (S2). The high frequency image includes the same array of pixels as that in the obtained image. Specifically, the number of pixels in height×the number of pixels in width of the high frequency image are the same as the number of pixels in height×the number of pixels in width of the obtained image. For each of the pixels of the high frequency image, having a larger pixel value means that the pixel includes a higher frequency component. Specifically, first generator 112 applies, to each of the plurality of first pixels of the image, a high-pass filter that uses a plurality of luminance values (Y signal values) of 7×7 pixels based on (for example, centered on) the first pixel, calculates a pixel value corresponding to the first pixel, and generates the high frequency image.

Note that in order to calculate the pixel value of the high frequency image that corresponds to one pixel, the 7×7 pixels centered on the one pixel are designated as the plurality of pixels to be subject to the high-pass filter, but this is not limiting; a×b pixels based on the one pixel may be used instead. One of a and b is an integer greater than or equal to 1, and the other is an integer greater than or equal to 2. The high frequency image generated by first generator 112 is output to compositor 114. Step S2 is one example of the step of generating a high frequency image.

Second generator 113 generates one or more color images corresponding to one or more different colors on the basis of color information based on the plurality of first pixel values of the obtained image (S3). The color image includes the same array of pixels as that in the obtained image. Specifically, the number of pixels in height×the number of pixels in width of the color image are the same as the number of pixels in height×the number of pixels in width of the obtained image. For each of the pixels of the color image, having a lager pixel value means that the pixel is closer to a pixel having a color in the color range determined as having a corresponding color. In the process of generating the color image, using the hue histogram, second generator 113 identifies, in the image, a first color as a specific color and second and third colors that frequently appear other than the specific color, extracts pixels having pixel values indicating the identified first, second, and third colors, and thus generates a color image. Step S3 is one example of the step of generating one or more color images.

Note that second generator 113 is not limited to performing the above-described operation and may identify, using the hue histogram, the first, second, and third colors that frequently appear in the image. In this manner, instead of determining the first color in advance, a different color may be dynamically determined as the first color on the basis of the order of frequency of appearance in the image.

Note that the specific color is a human skin color in the present embodiment. The human skin color is, for example, any human skin color that exists in the world. In other words, the color range determined as having the specific color is a hue range defined by a union including all skin colors including black-based, white-based, and yellow-based colors.

Note that the color range determined as having the specific color, the color range determined as having the second color, and the color range determined as having the third color are each not limited to being defined by the hue range, and may each be defined, for example, by a range based on the HLS color space indicated with the use of three indexes, i.e., hue, saturation, and luminance. The color range in this case is not limited to being defined by this HLS color space and may be defied by other color spaces indicated with the use of at least two indexes, i.e., hue and saturation, such as the HSV color space. Note that the specific color is set to a human skin color in order to identify a person as a subject in the present embodiment, but is not limited to the human skin color and may be an inherent color of an object other than persons in the case where the subject is different from persons.

Figure 5:
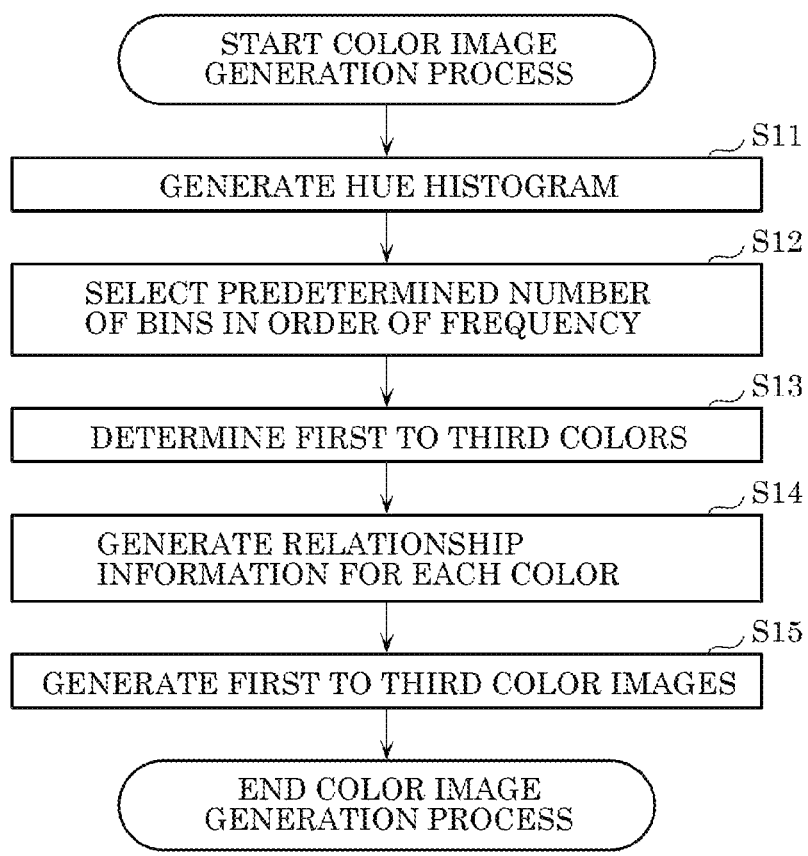
FIG. 5 is a flowchart illustrating a specific example of the process of generating a color image.
Figure 6:
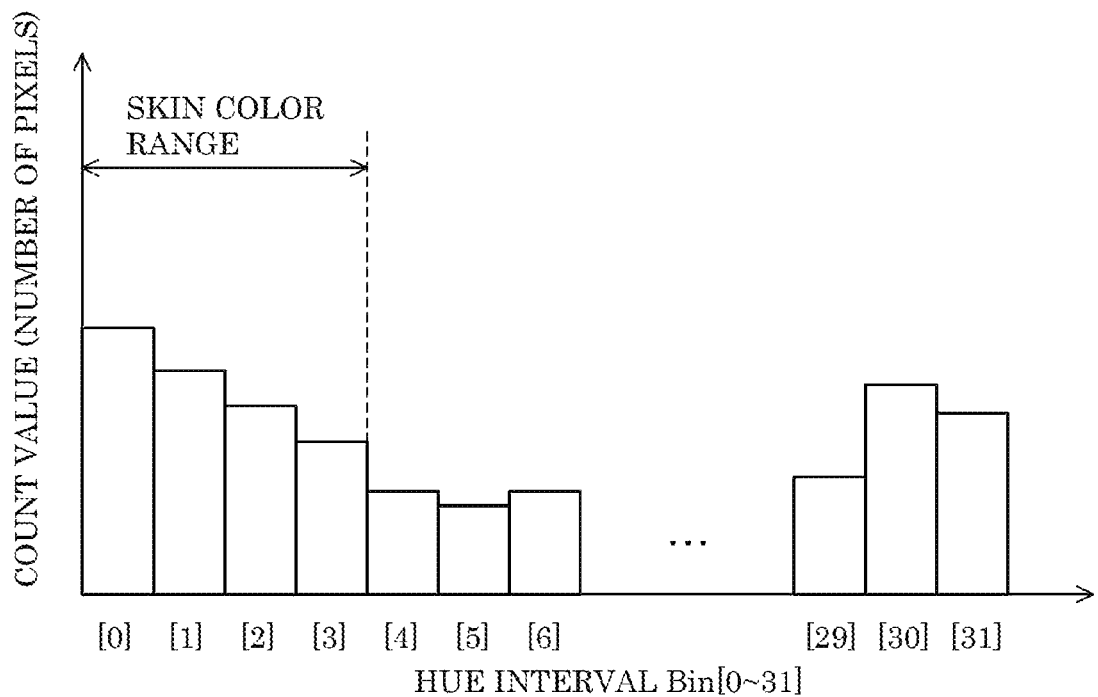
FIG. 6 is a diagram illustrating one example of a hue histogram.
Figure 7:
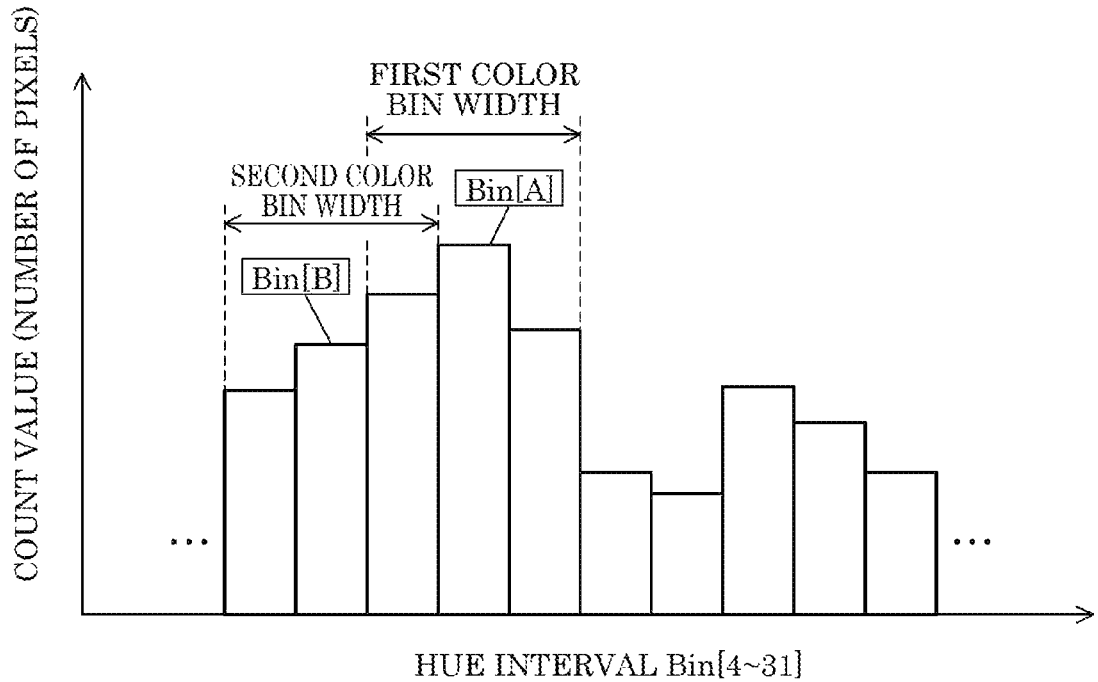
FIG. 7 is a diagram illustrating one example of a hue histogram for describing the process of selecting a bin.

A specific example of the process of generating the color image will be described with reference to FIG. 5 to FIG. 7. FIG. 5 is a flowchart illustrating a specific example of the process of generating the color image. FIG. 6 is a diagram illustrating one example of the hue histogram. FIG. 7 is a diagram illustrating one example of the hue histogram for describing the process of selecting a bin.

As illustrated in FIG. 5, second generator 113 generates a hue histogram for the obtained image (S11). Second generator 113 calculates the hue of each of the plurality of first pixels of the image from the first pixel value of the pixel, counts pixels in each of predetermined hue ranges, and thus generates the hue histogram.

The hue histogram is a graph with the number of pixels in frequencies and the hue ranges in bins, as illustrated in FIG. 6, for example. The hue histogram is a graph representing the distribution of pixels in hue ranges.

In the present embodiment, the hue histogram has 32 bins arranged in one-to-one correspondence with 32 hue ranges obtained by dividing the whole hue range into 32 subranges. For example, in the hue histogram, hue ranges Bin [0] to Bin [3] are defined as a specific hue range determined as having a specific color. Note that hue ranges Bin [0] to Bin [3] are cited as one example of the specific hue range; the specific hue range is not limited to this range. More specifically, the hue histogram is not limited to a configuration in which one bin is provided for each of predetermined hue ranges, such as that illustrated in FIG. 6, and may be configured to have one bin for each value of hue.

Next, second generator 113 selects a predetermined number of bins in descending order of frequency from among a plurality of bins remaining after excluding one or more specific bins determined as having a specific color from the plurality of bins (in the present embodiment, 32 bins) included in the generated hue histogram (S12).

Here, the process of selecting a bin in Step S12 will be specifically described with reference to FIG. 7. In the case of the hue histogram illustrated in FIG. 7, Bin [0] to Bin [3], which are a specific hue range, are excluded. Note that when the specific hue range is different from a human skin color, a specific hue range corresponding to the different color will be excluded. The process of selecting a bin is selecting, in descending order of frequency, colors that frequently appear in the hue histogram, specifically, the second and third colors other than the specific color that is the first color.

First, second generator 113 selects the second color which is most frequently appears other than the specific color. In selecting the second color, first, second generator 113 selects a bin with the highest frequency (Bin [A]) from the hue histogram with the specific hue range removed, for example. Subsequently, second generator 113 selects, as the bins for the second color, bins (in the present embodiment, three bins) having a bin width that is the widths of a predetermined number of bins based on the selected bin (Bin [A]). Note that the "predetermined number" of bins for defining the bin width is a number greater than or equal to 1. In the example of FIG. 7, second generator 113 selects, as the bins for the second color, three bins including the bin with the highest frequency and two adjacent bins on both sides thereof.

Next, in the case of selecting the third color different from the second color, second generator 113 selects a bin with the highest frequency (Bin [B]) from among the plurality of bins except the three bins selected as the bins for the second color. Subsequently, in selecting the third color, second generator 113 selects, as the bins for the third color, bins having a predetermined skip width based on the selected bin (Bin [B]). In the example of FIG. 7, second generator 113 selects, as the bins for the third color, three bins including the bin with the highest frequency and two adjacent bins on both sides thereof. In this case, one of the three bins selected in the selecting of the third color overlaps one of the three bins already selected in the selecting of the second color.

In this manner, second generator 113 selects, in descending order of frequency, colors that frequently appear in the hue histogram other than the specific color. The present embodiment exemplifies the case where two colors, the second color and the third color, are selected other than the specific color. Note that in the next case of further selecting a fourth color different from the second color and the third color, a bin with the highest frequency among the plurality of bins except the five bins selected as the bins for the second and third colors will be selected. Hereinafter, substantially the same process will be repeated.

Subsequently, second generator 113 determines, as the first color, a color indicated by the specific hue range (namely, the first hue range), determines, as the second color, a color indicated by the hue range of the three bins selected in the selecting of the second color (namely, the second hue range), and determines, as the third color, a color indicated by the hue range of the three bins selected in the selecting of the third color (namely, the third hue range) (S13).

Next, when each color range is determined, second generator 113 generates, for each color, relationship information indicating the relationship between the hue range and the pixel value, for setting a pixel value included in the determined color range to the maximum value, for example, setting a pixel value included in a range located outside said color range across a range having a predetermined width to the minimum value, for example, and setting a pixel value in the range having the predetermined width outside said color range to a value decreasing from the maximum value to the minimum value with an increase in the distance to the determined color range (S14). Note that in generating the relationship information, second generator 113 may set pixel value P1 instead of the maximum value of the pixel value and set pixel value P2 smaller than pixel value P1 instead of the minimum value of the pixel value. Furthermore, pixel value P1 and pixel value P2 may be set to different values per color.

Subsequently, using the relationship information generated for each of the first color, the second color, and the third color from the obtained image, second generator 113 generates a color image for each color by applying the relationship information for the color to the image (S15). Specifically, second generator 113 converts, for each of the plurality of pixels of the image, the pixel value of the pixel into a pixel value associated with a color (hue) based on the pixel value in the relationship information for the color, and thus generates a color image.

Referring back to FIG. 3 and FIG. 4, this description continues.

Compositor 114 removes the background from each of the high frequency image generated by first generator 112 and the first, second, and third color images generated by second generator 113 (S4). A specific example of the process of removing the background will be described with reference to FIG. 8 and FIG. 9.

Figure 8:
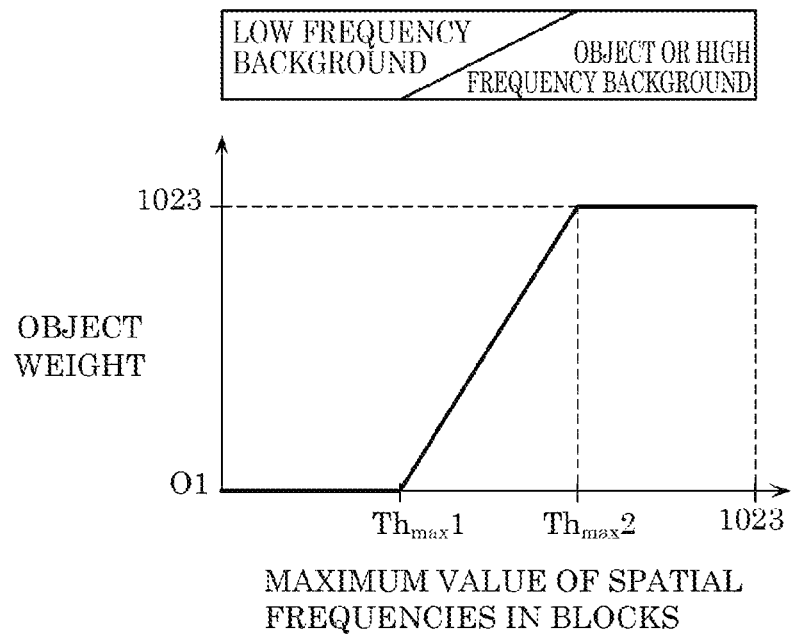
FIG. 8 is a diagram for describing the process of removing a low frequency background in the process of removing a background.
Figure 9:
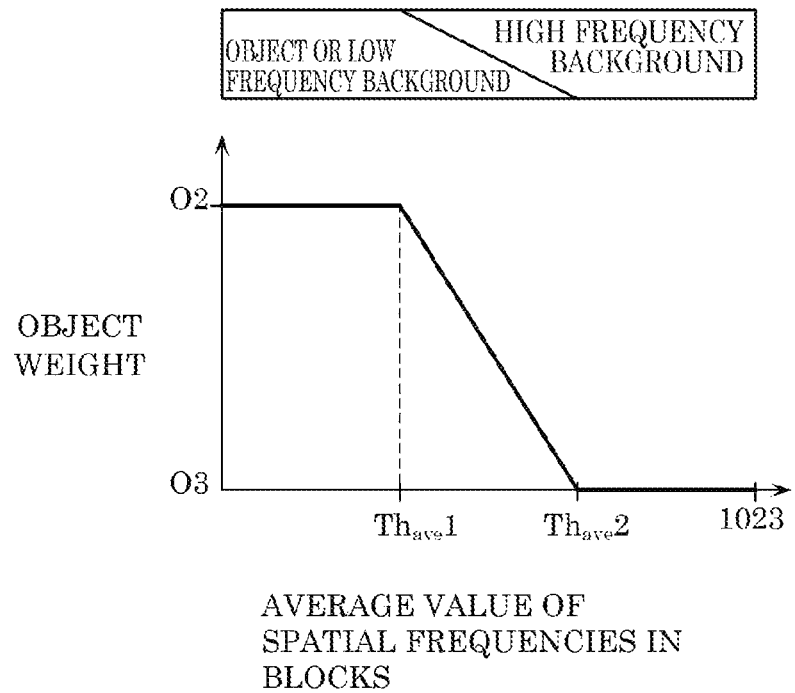
FIG. 9 is a diagram for describing the process of removing a high frequency background in the process of removing a background.

FIG. 8 is a diagram for describing the process of removing a low frequency background in the process of removing the background. FIG. 9 is a diagram for describing the process of removing a high frequency background in the process of removing the background.

FIG. 8 is a diagram illustrating, for each of a plurality of blocks obtained by dividing the high frequency image into the plurality of blocks, the relationship between the maximum value of a plurality of first pixel values of a plurality of first pixels of the block and an object weight allocated to the block according to the maximum value. In FIG. 8, the horizontal axis represents the maximum value of spatial frequencies in blocks, and the vertical axis represents the object weight allocated according to the maximum value of the spatial frequencies.

As illustrated in FIG. 8, compositor 114 specifies, for each block of the high frequency image, the object weight associated with the maximum value of the block in the relationship illustrated in FIG. 8, and allocates the specified object weight to the block. By applying the relationship in FIG. 8 to the high frequency image, compositor 114 allocates object weight O1 to a block having the maximum value of spatial frequencies less than threshold value $Th_{max}1$, and allocates object weight 1023 to a block having the maximum value of spatial frequencies greater than or equal to threshold value $Th_{max}2$. For a block having the maximum value of spatial frequencies greater than or equal to threshold value $Th_{max}1$, but less than threshold value $Th_{max}2$, compositor 114 specifies an object weight that becomes closer to object weight 1023 with an increase in the maximum value and becomes closer to object weight O1 with a decrease in the maximum value. For example, in the range where the maximum value of spatial frequencies is greater than or equal to threshold value $Th_{max}1$, but less than threshold value $Th_{max}2$, the object weight changes linearly with respect to changes in the maximum value of spatial frequencies. Thus, a first weight image which is used to suppress the low frequency background and in which each pixel has an object weight is obtained.

Note that object weight O1 has a value smaller than object weight 1023, for example.

The object weight allocated to a block having the maximum value of spatial frequencies greater than or equal to threshold value $Th_{max}2$ is not limited to 1023 and may be any other values such as 255.

FIG. 9 is a diagram illustrating, for each of a plurality of blocks obtained by dividing the high frequency image into the plurality of blocks, the relationship between the average value of a plurality of first pixel values of the plurality of first pixels of the block and an object weight allocated to the block according to the average value. In FIG. 9, the horizontal axis represents the average value of spatial frequencies in blocks, and the vertical axis represents the object weight allocated according to the average value of spatial frequencies.

As illustrated in FIG. 9, compositor 114 specifies, for each block of the high frequency image, the object weight associated with the maximum value of the block in the relationship illustrated in FIG. 9, and allocates the specified object weight to the block. By applying the relationship in FIG. 9 to the high frequency image, compositor 114 allocates object weight O2 to a block having the average value of spatial frequencies less than threshold value $Th_{ave}1$, and allocates object weight O3 to a block having the average value of spatial frequencies greater than or equal to threshold value $Th_{ave}2$. For a block having the average value of spatial frequencies greater than or equal to threshold value $Th_{ave}1$, but less than threshold value $Th_{ave}2$, compositor 114 specifies an object weight that becomes closer to object weight O3 with an increase in the average value and becomes closer to object weight O2 with a decrease in the average value. For example, in the range where the average value of spatial frequencies is greater than or equal to threshold value $Th_{ave}1$, but less than threshold value $Th_{ave}2$, the object weight changes linearly with respect to changes in the average value of spatial frequencies. Thus, a second weight image which is used to suppress the high frequency background and in which each pixel has an object weight is obtained.

Compositor 114 applies the first weight image and the second weight image to each of the high frequency image, the first color image, the second color image, and the third color image, to remove the low frequency background and the high frequency background from each of the high frequency image, the first color image, the second color image, and the third color image. Compositor 114 applies the first weight image to each of the high frequency image, the first color image, the second color image, and the third color image by multiplying the plurality of pixel values of the plurality of pixels of each of the high frequency image, the first color image, the second color image, and the third color image by the plurality of pixel values of the plurality of pixels of the first weight image. Similarly, compositor 114 applies the second weight image to each of the high frequency image, the first color image, the second color image, and the third color image by multiplying the plurality of pixel values of the plurality of pixels of each of the high frequency image, the first color image, the second color image, and the third color image by the plurality of pixel values of the plurality of pixels of the second weight image.

Note that compositor 114 may perform the process of emphasizing contrast on each of the high frequency image, the first color image, the second color image, and the third color image with the background removed. Compositor 114 is not required to perform the process of removing the background.

Next, compositor 114 generates a composite image by weighted addition of the high frequency image, the first color image, the second color image, and the third color image with the background removed. The following assumes that compositor 114 performs the process on the high frequency image, the first color image, the second color image, and the third color image with the background removed. Note that in the case where the background is not removed, compositor 114 performs the process on the high frequency image, the first color image, the second color image, and the third color image from each of which the background has not been removed.

Figure 10:
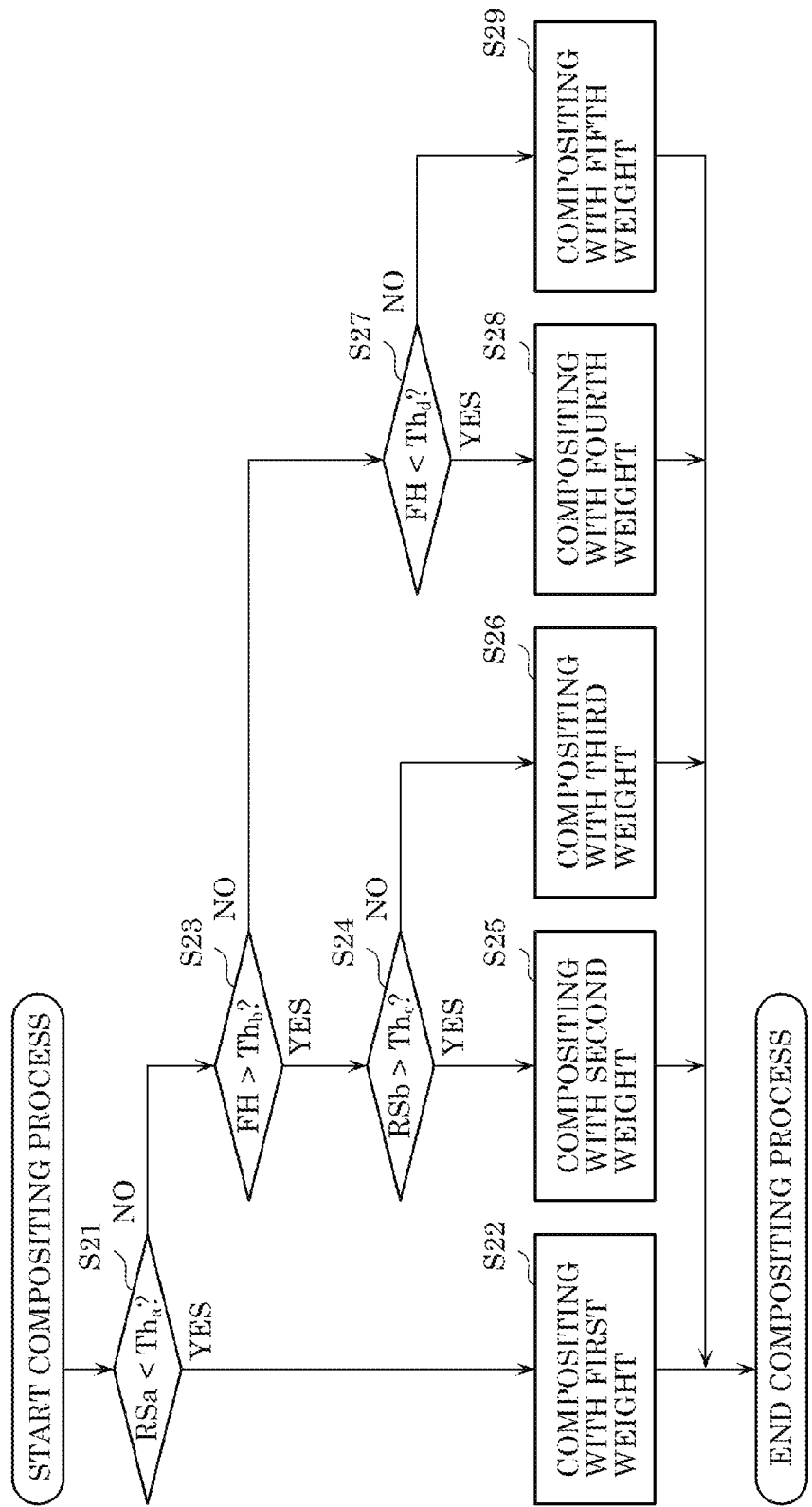
FIG. 10 is a flowchart illustrating a specific example of the process of generating a composite image.

Using the high frequency image, the first color image, the second color image, and the third color image, compositor 114 determines whether the scene in the image is the first scene, the second scene, the third scene, or the fourth scene, performs weighted addition with the weight corresponding to the determined scene, and thus generates a composite image. A specific example of the process of generating the composite image will be described with reference to FIG. 10. FIG. 10 is a flowchart illustrating a specific example of the process of generating the composite image.

As illustrated in FIG. 10, compositor 114 determines whether or not the size of region RSa made up of pixels determined as having the specific color in the obtained image is smaller than threshold value $Th_a$ (S21). The size of region RSa is a value related to the sum total of all the pixel values included in the first color image. For example, the size of region RSa may be the total of a plurality of average values calculated for the plurality of blocks included in the first color image. Each of the plurality of average values is the average value of the plurality of pixel values of the plurality of pixels of the corresponding block. Here, the first color image used to calculate the size of region RSa is the first color image with the background removed. Note that region RSa is one example of the second region, and threshold value $Th_a$ is one example of the fourth threshold value.

When the size of region RSa is smaller than threshold value $Th_a$ (YES in S21), compositor 114 determines that the image is the first scene, and performs weighted addition of the high frequency image, the first color image, the second color image, and the third color image with the first weight (S22). Specifically, compositor 114 determines that as the first weights, weight W11 is to be applied to the high frequency image and weights W12a, W12b, W12c are to be applied to the first color image, the second color image, and the third color image, respectively.

Thus, compositor 114 generates a composite image by adding, for each of the corresponding pixels, the value obtained by multiplying a corresponding one of the plurality of pixel values of the high frequency image by weight W11, the value obtained by multiplying a corresponding one of the plurality of pixel values of the first color image by weight W12a, the value obtained by multiplying a corresponding one of the plurality of pixel values of the second color image by weight W12b, and the value obtained by multiplying a corresponding one of the plurality of pixel values of the third color image by weight W12c. Note that in the weighted addition of the high frequency image, the first color image, the second color image, and the third color image, compositor 114 performs the weighted addition for each pixel, but is not limited to this per-pixel operation; the weighted addition may be performed for each block made up of a group of a plurality of pixels. In the weighted addition, it is sufficient that compositor 114 perform the weighted addition on a per predetermined region basis. For example, compositor 114 determines each of weight W11, weight W12a, weight W12b, and weight W12c to be zero.

When the size of region RSa is larger than or equal to threshold value $Th_a$ (NO in S21), compositor 114 determines whether or not high frequency component FH included in the obtained image is greater than threshold value $Th_b$ (S23). High frequency component FH of the image is a value related to the sum total of all the pixel values included in the high frequency image. For example, high frequency component FH of the image may be the total of a plurality of average values calculated for the plurality of blocks included in the high frequency image. Each of the plurality of average values is the average value of the plurality of pixel values of the plurality of pixels of the corresponding block. Threshold value $Th_b$ is one example of the first threshold value.

When high frequency component FH is greater than threshold value $Th_b$ (YES in S23), compositor 114 determines whether or not the size of region RSb in which the high frequency image and each of the color images overlap each other is larger than threshold value $Th_c$ (S24). Note that the processes in Steps S24, S25 are performed independently for each of the color images. The following describes the case where the color image is the first color image. Substantially the same process is performed independently on the other second and third color images.

Here, the size of region RSb varies among the color images and is a value related to the percentage of pixels determined as having the first color among pixels having high frequency components and the percentage of pixels determined as having high frequency components among pixels determined as having the first color. The size of region RSb is defined using a first total and a second total, for example. The first total is obtained by dividing, by the total of a plurality of first average values, the total of two or more values obtained by multiplying a first average value by a second average value for each of the corresponding blocks where the plurality of first average values are a plurality of average values calculated for the plurality of blocks included in the high frequency image, and the plurality of second average values are a plurality of average values calculated for the plurality of blocks included in the first color image. Note that the average value is the average value of the plurality of pixel values of the plurality of pixels in each block. The second total is obtained by diving, by the total of the plurality of second average values, the total of two or more values obtained by multiplying the first average value by the second average value for each of the corresponding blocks.

In other words, compositor 114 may perform the determination in Step S24 using the first total and the second total. For example, when the first total is greater than threshold value $Th_{c1}$ and the second total is greater than threshold value $Th_{c2}$, compositor 114 may determine that the size of region RSb is larger than threshold value $Th_c$.

When the size of region RSb is larger than threshold value $Th_c$ (YES in S24), compositor 114 determines that the image is the second scene, and performs weighted addition of the high frequency image and the first color image with the second weight (S25). Specifically, compositor 114 determines that as the second weights, weight W21 is to be applied to the high frequency image and weight W22a is to be applied to the first color image. Compositor 114 performs, on each of the second color image and the third color image, substantially the same process as that performed on the first color image, and thus determines that weight W22b is to be applied to the second color image and weight W22c is to be applied to the third color image.

Thus, compositor 114 generates a composite image by adding, for each of the corresponding pixels, the value obtained by multiplying a corresponding one of the plurality of pixel values of the high frequency image by weight W21, the value obtained by multiplying a corresponding one of the plurality of pixel values of the first color image by weight W22a, the value obtained by multiplying a corresponding one of the plurality of pixel values of the second color image by weight W22b, and the value obtained by multiplying a corresponding one of the plurality of pixel values of the third color image by weight W22c. Note that in the weighted addition of the high frequency image, the first color image, the second color image, and the third color image, compositor 114 performs the weighted addition for each pixel, but is not limited to this per-pixel operation; the weighted addition may be performed for each block made up of a group of a plurality of pixels. In the weighted addition, it is sufficient that compositor 114 perform the weighted addition on a per predetermined region basis. For example, compositor 114 determines each of weight W21, weight W22a, weight W22b, and weight W22c to be a value smaller than a predetermined reference value. Threshold value $Th_c$ is one example of the third threshold value. Note that threshold value $Th_c$ as the third threshold value may vary for each color image subject to Steps S24, S25.

Note that since compositor 114 performs Step S24 for each color image, there are cases where the color image determined as YES in Step S24 and the color image determined as NO in Step S24 are mixed. In the case where the result of the determination in Step S24 varies for each color image as just mentioned, the weight to be applied to the color image determined as NO in Step S24 is determined to be a third weight to be described later. Note that since second weight W21 and third weight W31 to be applied to the high frequency image are equal, when the result of the determination in Step S23 is YES, the weight to be applied to the high frequency image is the same no matter which of second weight W21 and third weight W31 is applied.

When the size of region RSb in every color image is smaller than or equal to threshold value $Th_c$ (NO in S24), compositor 114 determines that the image is the third scene, and performs weighted addition of the high frequency image, the first color image, the second color image, and the third color image with the third weight (S26). Specifically, compositor 114 determines that as the third weights, weight W31 is to be applied to the high frequency image and weights W32a, W32b, W32c are to be applied to the first color image, the second color image, and the third color image, respectively.

Thus, compositor 114 generates a composite image by adding, for each of the corresponding pixels, the value obtained by multiplying a corresponding one of the plurality of pixel values of the high frequency image by weight W31, the value obtained by multiplying a corresponding one of the plurality of pixel values of the first color image by weight W32a, the value obtained by multiplying a corresponding one of the plurality of pixel values of the second color image by weight W32b, and the value obtained by multiplying a corresponding one of the plurality of pixel values of the third color image by weight W32c. Note that in the weighted addition of the high frequency image, the first color image, the second color image, and the third color image, compositor 114 performs the weighted addition for each pixel, but is not limited to this per-pixel operation; the weighted addition may be performed for each block made up of a group of a plurality of pixels. In the weighted addition, it is sufficient that compositor 114 perform the weighted addition on a per predetermined region basis. For example, compositor 114 determines weight W31 to be a value smaller than each of weights W32a, W32b, W32c. Note that weights W22a, W22b, W22c are values smaller than weights W32a, W32b, W32c, respectively.

When high frequency component FH is less than or equal to threshold value $Th_b$ (NO in S23), compositor 114 determines whether or not high frequency component FH is less than threshold value $Th_d$ (S27). Threshold value $Th_d$ is one example of the second threshold value. Note that threshold value $Th_d$ is a value smaller than threshold value $Th_b$.

When high frequency component FH is less than threshold value $Th_d$ (YES in S27), compositor 114 determines that the image is the fourth scene, and performs weighted addition of the high frequency image, the first color image, the second color image, and the third color image with the fourth weight (S28). Specifically, compositor 114 determines that as the fourth weights, weight W41 is to be applied to the high frequency image and weights W42a, W42b, W42c are to be applied to the first color image, the second color image, and the third color image, respectively.

Thus, compositor 114 generates a composite image by adding, for each of the corresponding pixels, the value obtained by multiplying a corresponding one of the plurality of pixel values of the high frequency image by weight W41, the value obtained by multiplying a corresponding one of the plurality of pixel values of the first color image by weight W42a, the value obtained by multiplying a corresponding one of the plurality of pixel values of the second color image by weight W42b, and the value obtained by multiplying a corresponding one of the plurality of pixel values of the third color image by weight W42c. For example, compositor 114 determines weight W41 to be a value larger than weight W42. Note that weight W41 is a value larger than weights W21, W31. Weights W42a, W42b, W42c are values equal to weights W22a, W22b, W22c, respectively. This means that weights W42a, W42b, W42c are values smaller than weights W32a, W32b, W32c, respectively. Note that weights W42a, W42b, W42c and weights W22a, W22b, W22c are not limited to being values equal to each other, and may be different values.

When high frequency component FH is greater than or equal to threshold value $Th_d$ (NO in S27), compositor 114 determines that the image is the fifth scene, and performs weighted addition of the high frequency image, the first color image, the second color image, and the third color image with the fifth weight (S29). Specifically, compositor 114 determines that as the fifth weights, weight W51 is to be applied to the high frequency image and weights W52a, W52b, W52c are to be applied to the first color image, the second color image, and the third color image, respectively. Thus, compositor 114 generates a composite image by adding, for each of the corresponding pixels, the value obtained by multiplying a corresponding one of the plurality of pixel values of the high frequency image by weight W51, the value obtained by multiplying a corresponding one of the plurality of pixel values of the first color image by weight W52a, the value obtained by multiplying a corresponding one of the plurality of pixel values of the second color image by weight W52b, and the value obtained by multiplying a corresponding one of the plurality of pixel values of the third color image by weight W52c. Note that in the weighted addition of the high frequency image, the first color image, the second color image, and the third color image, compositor 114 performs the weighted addition for each pixel, but is not limited to this per-pixel operation; the weighted addition may be performed for each block made up of a group of a plurality of pixels. In the weighted addition, it is sufficient that compositor 114 perform the weighted addition on a per predetermined region basis.

Outputter 116 outputs the composite image obtained by the process performed by compositor 114 in Step S22, S25, S26, S28, or S29 (S6). Note that before the output, outputter 116 may perform the process of equalizing the plurality of pixel values in a target region which is indicated by pixels having pixel values greater than zero in the composite image, the process of setting, to third pixel values, the plurality of pixel values in a third region which is indicated by pixels having pixel values greater than a threshold values, and setting, to fourth pixel values, the plurality of pixel values in a fourth region which is indicated by pixels having pixel values less than the threshold value, the process of adjusting gain by multiplying the plurality of pixel values by a coefficient, or the process of maximizing the dynamic range of the plurality of pixel values.

Next, corrector 117 performs a predetermined image process on the image obtained by obtainer 111, on the basis of the plurality of second pixel values of the plurality of second pixels of the composite image, and thus corrects the obtained image (S7). Corrector 117 performs gamma correction, for example, as the predetermined image process, on the target region identified using the plurality of second pixel values of the plurality of second pixels of the composite image. For example, corrector 117 identifies, as the target region, a region made up of a group of one or more second pixels having second pixel values greater than a threshold value for identifying the target region.

Note that obtainer 111, first generator 112, second generator 113, compositor 114, outputter 116, and corrector 117 are provided as control circuit 103.

Note that the first weight, the second weight, the third weight, and the fourth weight are stored in storage 115.

Furthermore, the threshold values to be used in the processes are stored in storage 115. Storage 115 is provided as memory 104, for example.

Advantageous Effects, Etc

As described above, an image processing method according to the present embodiment includes: obtaining an image (S1); generating a high frequency image according to a high frequency component based on a plurality of first pixel values of a plurality of first pixels of the image obtained (S2); generating, according to color information based on the plurality of first pixel values of the image obtained, a first color image, a second color image, and a third color image corresponding to one or more different colors (S3); generating a composite image by weighted addition of the high frequency image, the first color image, the second color image, and the third color image (S5); and outputting the composite image generated (S6).

With this, the composite image obtained by combining the high frequency image and the first to third color images can be output as an image indicating a target region. Therefore, by using the composite image, it is possible to effectively identify the target region that is the region of a subject in the foreground, and it is possible to exclude, from the target region, the background region and the region of a subject in the background. Accordingly, the target region in the image can be effectively identified.

Furthermore, in the present embodiment, the step of generating the composite image includes assigning zero weight to the high frequency image and the first color image, the second color image, and the third color image, when the size of region RSa made up of pixels determined as having a specific color in the obtained image is smaller than threshold value $Th_a$. For example, when the size of region RSa made up of pixels determined as having the specific color in the image is smaller than threshold value $Th_a$, the scene of the obtained image can be estimated as a first scene in which the subject is not present in the foreground. Therefore, in this case, by assigning zero weight to the high frequency image and the one or more color images to generate the composite image, it is possible to output a composite image indicating that no target region is included in the image.

Furthermore, in the present embodiment, the step of generating the composite image includes assigning less weight to the high frequency image than to the first color image, the second color image, and the third color image, when high frequency component FH included in the image is greater than threshold value $Th_b$ and, in every color image, the size of region RSb in which the high frequency image and the first, second, and third color images overlap each other is smaller than or equal to threshold value $Th_c$. For example, when the high frequency component included in the image is greater than threshold value $Th_b$ and, in evert color image, the size of region RSb is smaller than or equal to threshold value $Th_c$, the scene of the obtained image can be estimated as a third scene in which the subject is present in the foreground and the background includes many high frequency components. Therefore, in this case, by assigning less weight to the high frequency image than to the one or more color images to generate the composite image, it is possible to reduce the occurrence of the subject in the foreground being excluded while reducing the occurrence of the background being identified as the target region.

Furthermore, in the present embodiment, the step of generating the composite image includes assigning less weight than a predetermined reference value to the high frequency image and each of the color images, when high frequency component FH included in the image is greater than threshold value $Th_b$ and the size of region RSb in which the high frequency image, the first color image, the second color image, and the third color image overlap each other is larger than threshold value $Th_c$. For example, when high frequency component FH included in the image is greater than threshold value $Th_b$ and the size of region RSb in which the high frequency image and each of the color images overlap each other is larger than threshold value $Th_c$, the scene of the obtained image can be estimated as a second scene in which the target region appears small. Therefore, in this case, by assigning less weight than the predetermined reference value to the high frequency image and the first to third color images to generate the composite image, it is possible to reduce the occurrence of the background being identified as the target region while leaving the region of the subject in the foreground as the target region.

Furthermore, in the present embodiment, the step of generating the composite image includes assigning more weight to the high frequency image than to the first color image, the second color image, and the third color image, when high frequency component FH included in the image is less than threshold value $Th_d$. For example, when high frequency component FH included in the image is less than threshold value $Th_d$, the scene of the obtained image can be estimated as a scene in which the subject is present in the foreground and the background includes many low frequency components. Therefore, in this case, by assigning more weight to the high frequency image than to the first color image, the second color image, and the third color image to generate the composite image, it is possible to reduce the occurrence of the subject in the foreground being excluded while reducing the occurrence of the background being identified as the target region.

[Variations]

(1) In the above embodiment, second generator 113 generates the first to third color images, but this is not limiting; second generator 113 generates the first color image, but is not required to generate the second color image or the third color image. In this case, the process to be performed on each of the color images in the embodiment is performed on the first color image alone. Furthermore, second generator 113 may generate four or more color images, namely, the first to $n^{-th}$ color images (n is an integer greater than or equal to 4).

(2) In the above embodiment, at the time of combining the images, compositor 114 selects the first weight, the second weight, the third weight, or the fourth weight which corresponds to whether the scene of the image is the first scene, the second scene, the third scene, or the fourth scene, but this is not limiting. For example, compositor 114 may set a weight that changes in the transition between the first scene and another scene.

Figure 11:
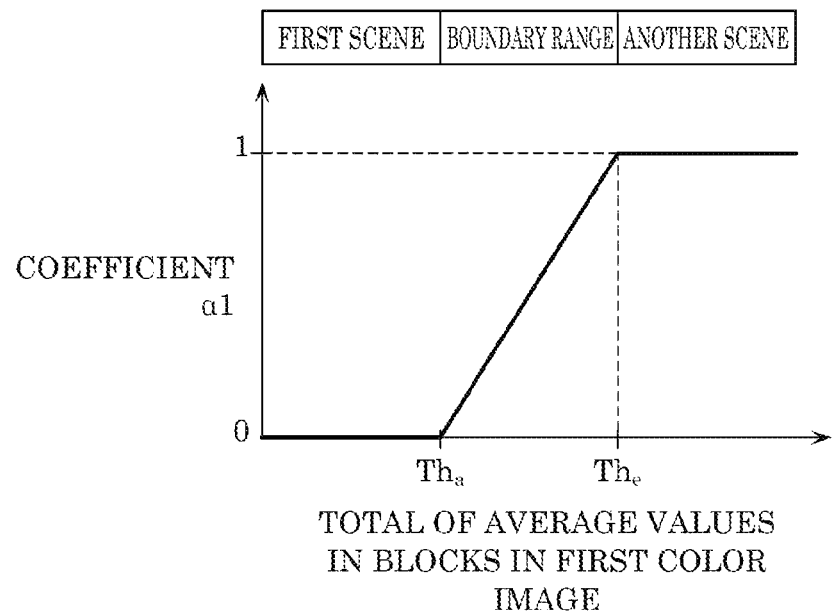
FIG. 11 is a diagram for describing a first output weight that is applied to compositing in the range between a first scene and another scene.

FIG. 11 is a diagram for describing a first output weight that is applied to compositing in the range between the first scene and another scene. In FIG. 11, the horizontal axis represents the total of the plurality of average values calculated for the plurality of blocks included in the first color image, and the vertical axis represents coefficient $\alpha 1$ that is allocated according to the total.

Using the relationship illustrated in FIG. 11, the first output weight that is applied to compositing in the range between the first scene and another scene is calculated by Equation 1 indicated below. Note that another scene is, for example, one of the second scene, the third scene, and the fourth scene. As the first output weight, three different values, specifically, the value calculated for the first scene and the second scene, the value calculated for the first scene and the third scene, and the value calculated for the first scene and the fourth scene, can be calculated.

First output weight=α1*weight for another scene+
(1−α1)*first weight  (Equation 1)

Here, the weight for another scene is the second weight when another scene is the second scene, the third weight when another scene is the third scene, and the fourth weight when another scene is the fourth scene.

Thus, when the total of the plurality of average values calculated for the plurality of blocks included in the first color image is less than threshold value $Th_a$, the scene is determined as the first scene, meaning that coefficient α1 is zero and compositing is performed with the first weight. On the other hand, when the total is greater than threshold value $Th_e$, the scene is determined as another scene, meaning that coefficient α1 is 1 and compositing is performed with the weight for the other scene. Threshold values $Th_e$ is greater than threshold value $Th_a$. When the total is between threshold value $Th_a$ and threshold value $Th_e$, inclusive, as the total increases, coefficient α1 becomes closer to 1, and thus compositing is performed with a weight closer in value to the weight for the other scene than to the first weight. In this manner, in the boundary range between the first scene and another scene, a value between the first weight and the weight for the other scene may be used as the weight for compositing.

Similarly, for example, compositor 114 may set a weight that changes in the transition between the second scene and the third scene.

Figure 12:
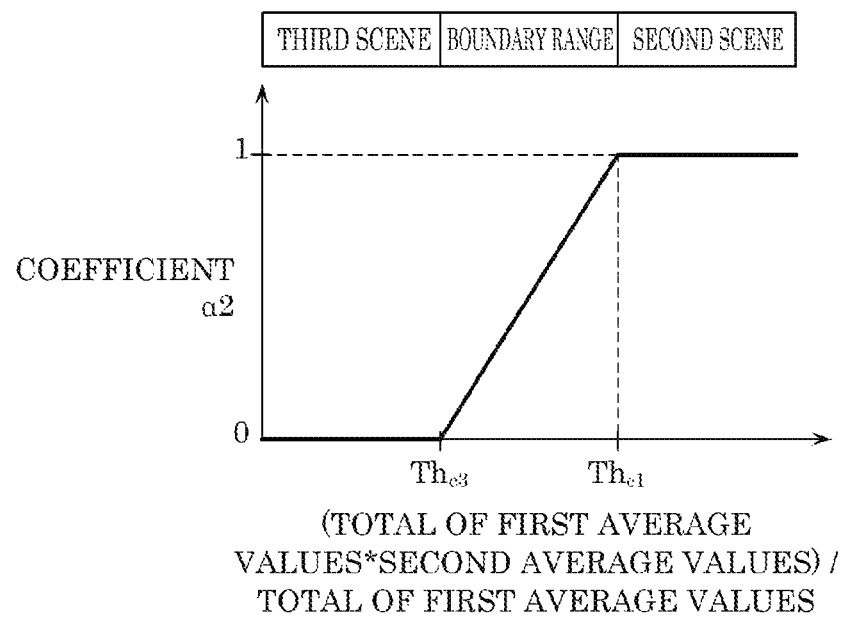
FIG. 12 is a diagram for describing a second output weight that is applied to compositing in the range between a second scene and a third scene.
Figure 13:
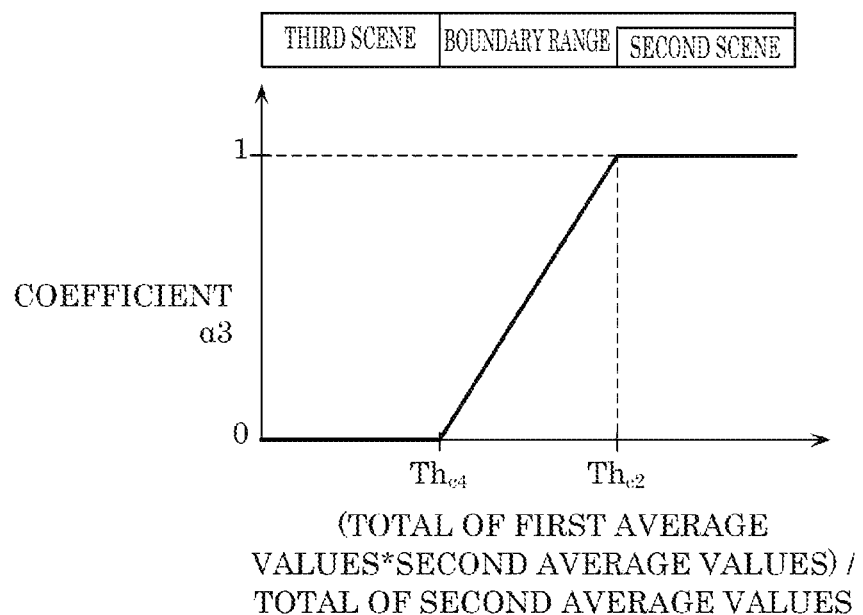
FIG. 13 is a diagram for describing a third output weight that is applied to compositing in the range between a second scene and a third scene.

FIG. 12 and FIG. 13 are diagrams for describing an output weight that is applied to compositing in the range between the second scene and the third scene. In FIG. 12, the horizontal axis represents the first total, and the vertical axis represents coefficient α2 that is allocated according to the first total. In FIG. 13, the horizontal axis represents the second total, and the vertical axis represents coefficient α3 that is allocated according to the second total.

Using the relationship illustrated in FIG. 12, the second output weight for calculating a third output weight that is applied to compositing in the range between the second scene and the third scene is calculated by Equation 2 indicated below.

Second output weight=α2*second weight+
(1−α2)*third weight  (Equation 2)

Using the relationship illustrated in FIG. 13, the third output weight that is applied to compositing in the range between the second scene and the third scene is calculated by Equation 3 indicated below.

Third output weight=α3*second output weight+(1−
α3)*third weight  (Equation 3)

Thus, when the first total is greater than threshold value $Th_{c1}$ and the second total is greater than threshold value $Th_{c2}$, both coefficient α2 and coefficient α3 are 1, and compositing is performed with the second weight. On the other hand, when the first total is less than threshold value $Th_{c3}$ and the second value is less than threshold value $Th_{c4}$, both coefficient α2 and coefficient α3 are 0, and compositing is performed with the third weight. Threshold value $Th_{c1}$ is greater than threshold value $Th_{c3}$, and threshold value $Th_{c2}$ is greater than threshold value $Th_{c4}$. Subsequently, in the case where the first total and the second total are different from those described above, as the first total increases or the second total increases, compositing is performed with a weight closer in value to the second weight than to the third weight. In this manner, in the boundary range between the second scene and third scene, a value between the second weight and the third weight may be used as the weight for compositing.

Note that each of threshold values $Th_{c1}$ to $Th_{c4}$ may vary for each color image subject to Steps S24, S25.

Similarly, for example, compositor 114 may set a weight that changes in the transition between the fourth scene and another scene.

Figure 14:
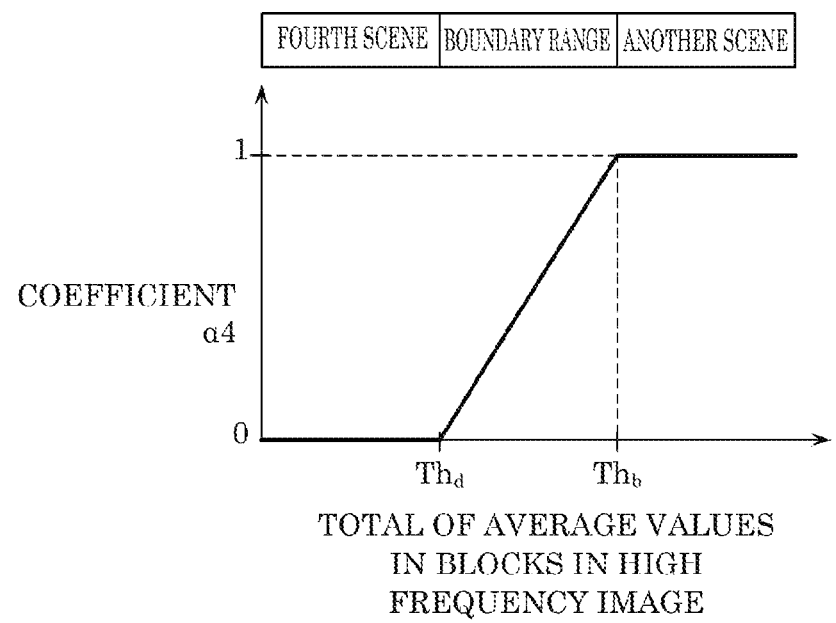
FIG. 14 is a diagram for describing a fourth output weight that is applied to compositing in the range between a fourth scene and another scene.

FIG. 14 is a diagram for describing a fourth output weight that is applied to compositing in the range between the fourth scene and another scene. In FIG. 14, the horizontal axis represents the total of the plurality of average values calculated for the plurality of blocks included in the high frequency image, and the vertical axis represents coefficient α4 that is allocated according to the total.

Using the relationship illustrated in FIG. 14, the fourth output weight that is applied to compositing in the range between the fourth scene and another scene is calculated by Equation 4 indicated below. Note that another scene is, for example, one of the first scene, the second scene, and the third scene. As the fourth output weight, three different values, specifically, the value calculated for the first scene and the second scene, the value calculated for the first scene and the third scene, and the value calculated for the first scene and the fourth scene, can be calculated.

Fourth output weight=α4*weight for another scene+
(1−α4)*fourth weight  (Equation 4)

Here, the weight for another scene is the first weight when another scene is the first scene, the second weight when another scene is the second scene, and the third weight when another scene is the third scene.

Specifically, when the total of the plurality of average values calculated for the plurality of blocks included in the high frequency image is greater than threshold value $Th_b$, the scene is determined as another scene, meaning that coefficient α4 is 1 and compositing is performed with the weight for the other scene. On the other hand, when the total is less than threshold value $Th_d$, the scene is determined as the fourth scene, meaning that coefficient α4 is zero and compositing is performed with the fourth weight. Threshold values $Th_b$ is greater than threshold value $Th_d$. When the total is between threshold value $Th_d$ and threshold value $Th_b$, inclusive, as the total increases, coefficient α4 becomes closer to 1, and thus compositing is performed with a weight closer in value to the weight for the other scene than to the fourth weight. In this manner, in the boundary range between the fourth scene and another scene, a value between the fourth weight and the weight for the other scene may be used as the weight for compositing.

Note that the fourth output weight may be calculated as the fifth weight in the embodiment.

(3) In the above embodiment, the process in Step S24 is performed after a positive determination result is obtained in Step S23, but this is not limiting; the process in Step S24 may be performed before Step S21 or may be performed after Step S21 and before Step S23. In either case, when a positive determination result is obtained in Step S23 and a positive determination result is obtained in Step S24, Step S25 is performed. It is sufficient that the process in Step S26 be performed when a negative determination result is obtained in Step S24 and a positive determination result is obtained in Step S23.

(4) In the above embodiment, image processing device 110 is a device built-in in display apparatus 100, but this is not limiting; image processing device 110 may be a device built-in in an imaging apparatus. An image processing device in this case, for example, obtains image data from an image sensor included in the imaging apparatus, performs the image processing method described in the above embodiment, and outputs a plurality of second pixels. The imaging apparatus may identify a subject by using the plurality of output second pixels, and may use the region of the identified subject in the process of adjusting focus or the process of adjusting exposure.

(5) In the above embodiment, display apparatus 100 includes tuner 101, and obtainer 111 is implemented using tuner 101, but this is not limiting. Obtainer 111 may obtain image data by reading image data recorded in a recording medium such as an optical disc, a secure digital (SD) card, a hard disk drive (HDD), and a solid-state drive (SSD). In this case, obtainer 111 may be implemented using an electrical device such as an optical pickup system that reads an optical disc. Alternatively, obtainer 111 may obtain image data from an external server via a network such as the Internet. In this case, obtainer 111 may be implemented using a communication interface for performing communication with an external server. Alternatively, obtainer 111 may obtain image data from an external device connected via an external interface such as a high-definition multimedia interface (HDMI) (registered trademark) terminal, a universal serial bus (USB) terminal, and a RCA terminal.

Note that in the above embodiment, each of the structural elements may be configured in the form of an exclusive hardware product or may be implemented by executing a software program suitable for the structural element. Each of the structural elements may be implemented by a program executing unit such as a central processing unit (CPU) or a processor reading and executing the software program recorded on a recording medium such as a hard disk or a semiconductor memory. Here, software for implementing the image decoding device, etc., according to the above embodiment is a program described below.

Specifically, this program causes a computer to execute an image processing method including: obtaining an image; generating a high frequency image according to a high frequency component based on a plurality of first pixel values of a plurality of first pixels of the image obtained; generating, according to color information based on the plurality of first pixel values of the image obtained, one or more color images corresponding to one or more different colors; generating a composite image by weighted addition of the high frequency image and the one or more color images; and outputting the composite image generated.

As described above, the embodiment is presented as exemplifications of the technique according to the present disclosure. The accompanying drawings and detailed description are provided for this purpose.

Therefore, the structural elements described in the accompanying drawings and detailed description include not only structural elements essential to solving the problem, but also structural elements that are not essential to solving the problem but are included in order to exemplify the aforementioned technique. As such, description of these non-essential structural elements in the accompanying drawings and the detailed description should not be taken to mean that these non-essential structural elements are essential.

Furthermore, since the foregoing embodiment is for exemplifying the technique according to the present disclosure, various changes, substitutions, additions, omissions, and so on, can be carried out within the scope of the Claims or its equivalents.

INDUSTRIAL APPLICABILITY

The present disclosure is applicable to an image processing method, etc., in which a target region that is the region of a subject in an image can be effectively identified. Specifically, the present disclosure is applicable to, for example, a display apparatus such as a television and an imaging apparatus such as a camera.

The invention claimed is:

1. An image processing method, comprising:
   obtaining an image;
   generating a high frequency image according to a high frequency component based on a plurality of first pixel values of a plurality of first pixels of the image obtained, the high frequency image being divided into a plurality of regions, and including a high frequency region that includes the high frequency component;
   generating, according to color information based on the plurality of first pixel values of the image obtained, one or more color images corresponding to one or more different colors, each of the one or more color images being divided into the plurality of regions, and including a specific color region having a corresponding specific color;
   generating a composite image by performing, for each of corresponding regions among the plurality of regions, weighted addition of the high frequency image and the one or more color images, the corresponding regions being at a same position in the high frequency image and the one or more color images; and
   outputting the composite image generated, wherein:
   one or more combinations, which result from combining the high frequency image with each of the one or more color images, include a first combination of the high frequency image and a color image among the one or more color images,
   the first combination has a relation in which a percentage of pixels determined as having high frequency components and having a specific color in the composite image is larger than a third threshold value larger than 0, and
   the generating of the composite image includes determining each of a first weight for the high frequency image and a first weight for the color image to be a value smaller than a predetermined reference value.

2. The image processing method according to claim 1, wherein
   the generating of the composite image includes assigning less weight to the high frequency image than to each of the one or more color images, when the high frequency component included in the image is greater than a first threshold value.

3. The image processing method according to claim 1, wherein
   the generating of the composite image includes assigning more weight to the high frequency image than to each of the one or more color images, when the high frequency component included in the image is less than a second threshold value.

4. The image processing method according to claim 1, wherein
   the generating of the composite image includes assigning zero weight to the high frequency image and each of the one or more color images, when a size of a second region made up of pixels determined as having a specific color in the image obtained is smaller than a fourth threshold value.

5. The image processing method according to claim 1, further comprising:
performing a predetermined image process on the image, based on a plurality of second pixel values of a plurality of second pixels of the composite image that has been output.

6. The image processing method according to claim 1, wherein:
the one or more combinations, which result from combining the high frequency image with each of the one or more color images, further include a second combination of the high frequency image and an other color image among the one or more color images,
the second combination has a relation in which a size of a first region made up of pixels each at a same position in the high frequency region in the high frequency image and the specific color region in the other color image is less than or equal to the third threshold value,
the first region of the second combination is the high frequency region in the high frequency image and is the specific color region in the other color image,
the generating of the composite image includes determining a second weight for the high frequency image and a second weight for the other color image,
the second weight for the high frequency image is identical to the first weight for the high frequency image, and
the second weight for the other color image is different from the first weight for the color image.

7. The image processing method according to claim 1, wherein
each of the one or more color images is generated by extracting a specific color corresponding to the color image from the image.

8. An image processing device, comprising:
a control circuit and a memory, the control circuit implementing an obtainer, a first generator, a second generator, a compositor and an outputter, wherein:
the obtainer obtains an image,
the first generator generates a high frequency image according to a high frequency component based on a plurality of first pixel values of a plurality of first pixels of the image obtained, the high frequency image being divided into a plurality of regions, and including a high frequency region that includes the high frequency component,
the second generator generates, according to color information based on the plurality of first pixel values of the image obtained, one or more color images corresponding to one or more different colors, each of the one or more color images being divided into the plurality of regions, and including a specific color region having a corresponding specific color,
the compositor generates a composite image by performing, for each of corresponding regions among the plurality of regions, weighted addition of the high frequency image and the one or more color images, the corresponding regions being at a same position in the high frequency image and the one or more color images; and
the outputter outputs the composite image generated,
one or more combinations, which result from combining the high frequency image with each of the one or more color images, include a first combination of the high frequency image and a color image among the one or more color images,
the first combination has a relation in which a percentage of pixels determined as having high frequency components and having a specific color in the composite image is larger than a third threshold value larger than 0, and
the generating of the composite image includes determining each of a first weight for the high frequency image and a first weight for the color image to be a value smaller than a predetermined reference value.

9. A non-transitory computer-readable recording medium having stored thereon a program for causing a computer to perform an image processing method including:
obtaining an image;
generating a high frequency image according to a high frequency component based on a plurality of first pixel values of a plurality of first pixels of the image obtained, the high frequency image being divided into a plurality of regions, and including a high frequency region that includes the high frequency component;
generating, according to color information based on the plurality of first pixel values of the image obtained, one or more color images corresponding to one or more different colors, each of the one or more color images being divided into the plurality of regions, and including a specific color region having a corresponding specific color;
generating a composite image by performing, for each of corresponding regions among the plurality of regions, weighted addition of the high frequency image and the one or more color images, the corresponding regions being at a same position in the high frequency image and the one or more color images; and
outputting the composite image generated, wherein:
one or more combinations, which result from combining the high frequency image with each of the one or more color images, include a first combination of the high frequency image and a color image among the one or more color images,
the first combination has a relation in which a percentage of pixels determined as having high frequency components and having a specific color in the composite image is larger than a third threshold value larger than 0, and
the generating of the composite image includes determining each of a first weight for the high frequency image and a first weight for the color image to be a value smaller than a predetermined reference value.

10. An image processing method, comprising:
obtaining an image;
generating a high frequency image according to a high frequency component based on a plurality of first pixel values of a plurality of first pixels of the image obtained, the high frequency image being divided into a plurality of regions, and including a high frequency region that includes the high frequency component;
generating, according to color information based on the plurality of first pixel values of the image obtained, one or more color images corresponding to one or more different colors, each of the one or more color images being divided into the plurality of regions, and including a specific color region having a corresponding specific color;
generating a composite image by performing, for each of corresponding regions among the plurality of regions, weighted addition of the high frequency image and the one or more color images, the corresponding regions being at a same position in the high frequency image and the one or more color images; and outputting the composite image generated, wherein the generating of the composite image includes:
    determining whether a size of a second region made up of pixels determined as having a specific color in the image obtained is smaller than a fourth threshold value; and
    assigning zero weight to the high frequency image and each of the one or more color images, when a result of the determining indicates that the size of the second region is smaller than the fourth threshold value.

11. The image processing method according to claim 10, wherein
the generating of the composite image includes assigning less weight to the high frequency image than to each of the one or more color images, when the high frequency component included in the image is greater than a first threshold value.

12. The image processing method according to claim 10, wherein
the generating of the composite image includes assigning more weight to the high frequency image than to each of the one or more color images, when the high frequency component included in the image is less than a second threshold value.

13. The image processing method according to claim 10, further comprising:
performing a predetermined image process on the image, based on a plurality of second pixel values of a plurality of second pixels of the composite image that has been output.

14. The image processing method according to claim 10, wherein
each of the one or more color images is generated by extracting a specific color corresponding to the color image from the image.

15. An image processing device, comprising:
a control circuit and a memory, the control circuit implementing an obtainer, a first generator, a second generator, a compositor and an outputter, wherein:
    the obtainer obtains an image,
    the first generator generates a high frequency image according to a high frequency component based on a plurality of first pixel values of a plurality of first pixels of the image obtained, the high frequency image being divided into a plurality of regions, and including a high frequency region that includes the high frequency component,
    the second generator generates, according to color information based on the plurality of first pixel values of the image obtained, one or more color images corresponding to one or more different colors, each of the one or more color images being divided into the plurality of regions, and including a specific color region having a corresponding specific color,
    the compositor generates a composite image by performing, for each of corresponding regions among the plurality of regions, weighted addition of the high frequency image and the one or more color images, the corresponding regions being at a same position in the high frequency image and the one or more color images,
    the outputter outputs the composite image generated, and
wherein the generating of the composite image includes:
    determining whether a size of a second region made up of pixels determined as having a specific color in the image obtained is smaller than a fourth threshold value; and
    assigning zero weight to the high frequency image and each of the one or more color images, when a result of the determining indicates that the size of the second region is smaller than the fourth threshold value.

16. A non-transitory computer-readable recording medium having stored thereon a program for causing a computer to perform an image processing method including:
obtaining an image;
generating a high frequency image according to a high frequency component based on a plurality of first pixel values of a plurality of first pixels of the image obtained, the high frequency image being divided into a plurality of regions, and including a high frequency region that includes the high frequency component;
generating, according to color information based on the plurality of first pixel values of the image obtained, one or more color images corresponding to one or more different colors, each of the one or more color images being divided into the plurality of regions, and including a specific color region having a corresponding specific color;
generating a composite image by performing, for each of corresponding regions among the plurality of regions, by weighted addition of the high frequency image and the one or more color images, the corresponding regions being at a same position in the high frequency image and the one or more color images; and
outputting the composite image generated,
wherein the generating of the composite image includes:
    determining whether a size of a second region made up of pixels determined as having a specific color in the image obtained is smaller than a fourth threshold value; and
    assigning zero weight to the high frequency image and each of the one or more color images, when a result of the determining indicates that the size of the second region is smaller than the fourth threshold value.

* * * * *